US010176379B1

(12) United States Patent
Barton et al.

(10) Patent No.: US 10,176,379 B1
(45) Date of Patent: Jan. 8, 2019

(54) INTEGRATING COMPUTER VISION AND WIRELESS DATA TO PROVIDE IDENTIFICATION

(71) Applicant: Cisco Technology, Inc., San Jose, CA (US)

(72) Inventors: Robert Barton, Richmond (CA); Jerome Henry, Pittsboro, NC (US); Joseph Bassaly, Oakville (CA); Vanessa Sulikowski, Pymble (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/995,846

(22) Filed: Jun. 1, 2018

(51) Int. Cl.
*H04W 24/00* (2009.01)
*G06K 9/00* (2006.01)
(Continued)

(52) U.S. Cl.
CPC .......... *G06K 9/00671* (2013.01); *H04N 7/18* (2013.01); *H04W 4/02* (2013.01);
(Continued)

(58) Field of Classification Search
CPC ....... G06K 9/00671; H04N 7/18; H04W 4/02; H04W 88/02; H04W 8/245; H04M 1/72519; H04M 1/72522; H04M 1/72525
(Continued)

(56) References Cited

U.S. PATENT DOCUMENTS 8,615,254 B2  12/2013  Jamtgaard et al.
9,270,952 B2   2/2016  Jamtgaard et al.
(Continued)

FOREIGN PATENT DOCUMENTS

CN  103426208 A   6/2014
CN  107529221 A  12/2017
(Continued)

OTHER PUBLICATIONS

Radaelli L., Moses Y., Jensen C.S. (2014) Using Cameras to Improve Wi-Fi Based Indoor Positioning. In: Pfoser D., Li KJ. (eds) Web and Wireless Geographical Information Systems. W2GIS 2014. Lecture Notes in Computer Science, vol. 8470. Springer, Berlin, Heidelberg, 18 pages.
(Continued)

*Primary Examiner* — Danh C Le
(74) *Attorney, Agent, or Firm* — Edell, Shapiro & Finnan, LLC

(57) ABSTRACT

In one example embodiment, an integration system obtains, based on data from a wireless location system, location data of a wireless device in a spatial area. The integration system determines location data of a person in the spatial area based on at least one image of the person captured by a camera. Based on the location data of the wireless device and the location data of the person, the integration system calculates a proximity parameter representing a spatial relationship between the wireless device and the person. Based on the proximity parameter, the integration system computes a probability of association between the wireless device and the person and determines, based on the probability of association, whether the person is a user of the wireless device.

20 Claims, 11 Drawing Sheets

(51) Int. Cl.
*H04N 7/18* (2006.01)
*H04W 4/02* (2018.01)
*H04W 88/02* (2009.01)
*H04M 1/725* (2006.01)

(52) U.S. Cl.
CPC .... *H04M 1/72519* (2013.01); *H04M 1/72522* (2013.01); *H04W 88/02* (2013.01)

(58) Field of Classification Search
USPC .................................. 455/456.3, 550.1, 418
See application file for complete search history.

(56) References Cited

U.S. PATENT DOCUMENTS

| | | | |
|---|---|---|---|
| 9,554,091 B1 | 1/2017 | Malegaonkar et al. | |
| 2013/0167207 A1* | 6/2013 | Davis | G06F 21/316 726/5 |
| 2013/0345961 A1* | 12/2013 | Leader | G01C 21/3617 701/410 |
| 2014/0047097 A1* | 2/2014 | Buehl | G06Q 10/087 709/224 |
| 2014/0095606 A1* | 4/2014 | Matus | H04L 67/22 709/204 |
| 2015/0161108 A1* | 6/2015 | Back | G06F 17/2785 704/9 |
| 2015/0348648 A1* | 12/2015 | Vadhavania | G11C 29/38 714/719 |
| 2016/0242009 A1* | 8/2016 | Ding | H04W 4/029 |
| 2017/0160893 A1* | 6/2017 | Koga | G06F 3/048 |
| 2017/0206421 A1 | 7/2017 | Pandey et al. | |
| 2017/0279957 A1* | 9/2017 | Abramson et al. | H04M 1/72577 |
| 2018/0039276 A1* | 2/2018 | Keivan | G05D 1/0246 |
| 2018/0047394 A1* | 2/2018 | Tian | G10L 15/24 |
| 2018/0181776 A1* | 6/2018 | Lim | G06F 21/84 |

FOREIGN PATENT DOCUMENTS

| | | |
|---|---|---|
| EP | 2119233 B1 | 11/2009 |
| WO | 2016180323 A1 | 11/2016 |

OTHER PUBLICATIONS

T. Teixeira, et al., "A Survey of Human-Sensing: Methods for Detecting Presence, Count, Location, Track and Identity", ENALAB Technical Report Sep. 2010, vol. 1, No. 1, Sep. 2010, 41 pages.

B. Ferris, et al., "WiFi-SLAM Using Gaussian Process Latent Variable Models", In Proceedings of the 20th International Joint Conference on Artificial Intelligence (IJCAI'07), Rajeev Sangal, Harish Mehta, and R. K. Bagga (Eds.). Morgan Kaufmann Publishers Inc., San Francisco, CA, USA, 2480-2485, 6 pages.

A. Gosai, et al., "Real Time Location based Tracking using WiFi Signals", International Journal of Computer Applications (0975-8887), vol. 101—No. 5, Sep. 2014, 6 pages.

J.D. Domingo, et al., "An Improved Indoor Positioning System Using RGB-D Cameras and Wireless Networks for Use in Complex Environments", Sensors 2017, 17, 2391; doi:10.3390/s17102391, www.mdpi.com.journal/sensors, https://www.researchgate.net/publication/320562117_An_Improved_Indoor_Positioning_System_Using_RGB-D_Cameras_and_Wireless_Networks_for_Use_in_Complex_Environment, 15 pages.

S. Van den Berghe, et al., "Fusing Camera and Wi-Fi Sensors for Opportunistic Localization", UBICOMM 2011: The Fifth International Conference on Mobile Ubiquitous Computing, Systems, Services and Technologies, 6 pages.

"The Sentient Surveillance Camera—What the world's first talking artificially intelligent camera says about the surveillance age", motherboard.vice.com, Sep. 10, 2015, https://motherboard.vice.com/en_us/article/nzea9q/sentient-surveillance-camera, 4 pages.

YouTube Video, "Example Autotracking camera with intelligent video analysis", https://www.youtube.com/watch?v=o27kRI0z0Fw, screenshots of 0:51-1:20, Visiotech, May 7, 2015, 15 pages.

"Face Detection using Haar Cascades", OpenCV, Open Source Computer Vision, http://Web.archive.org/web/2017024235824/https://docs.opencv.org/master/d7/d8b/tutorial_py_face_detection.html, Oct. 24, 2017, 3 pages.

Jing Yuan, "WiFi-based person identification", Proceedings of SPIE 10158, Optical Communication, Optical Fiber Sensors, and Optical Memories for Big Data Storage, 101580I, Oct. 25, 2016, doi: 10.1117/12.2245812, International Symposium on Optoelectronic Technology and Application, Oct. 2016, Beijing, China, 8 pages.

\* cited by examiner

US 10,176,379 B1

INTEGRATING COMPUTER VISION AND WIRELESS DATA TO PROVIDE IDENTIFICATION

TECHNICAL FIELD

The present disclosure generally relates to the computer vision and wireless fields.

BACKGROUND

A user having a wireless device that was not previously logged into a wireless network which operates in a certain environment, e.g. a Wi-Fi network operating in an enterprise, may want to log into the wireless network. The user may therefore register the wireless device with the wireless network by inputting into the wireless device data such as a user identifier and password. Such data may be stored in association with an identifier of the wireless device in order to facilitate future logging in of the wireless device to the wireless network.

Cameras that are part of a computer vision system may also be deployed in the certain environment. A computer vision system may be used in technologies such as collaboration, video surveillance, video telephony, telepresence, videoconferencing, telepresence video conferencing, etc.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
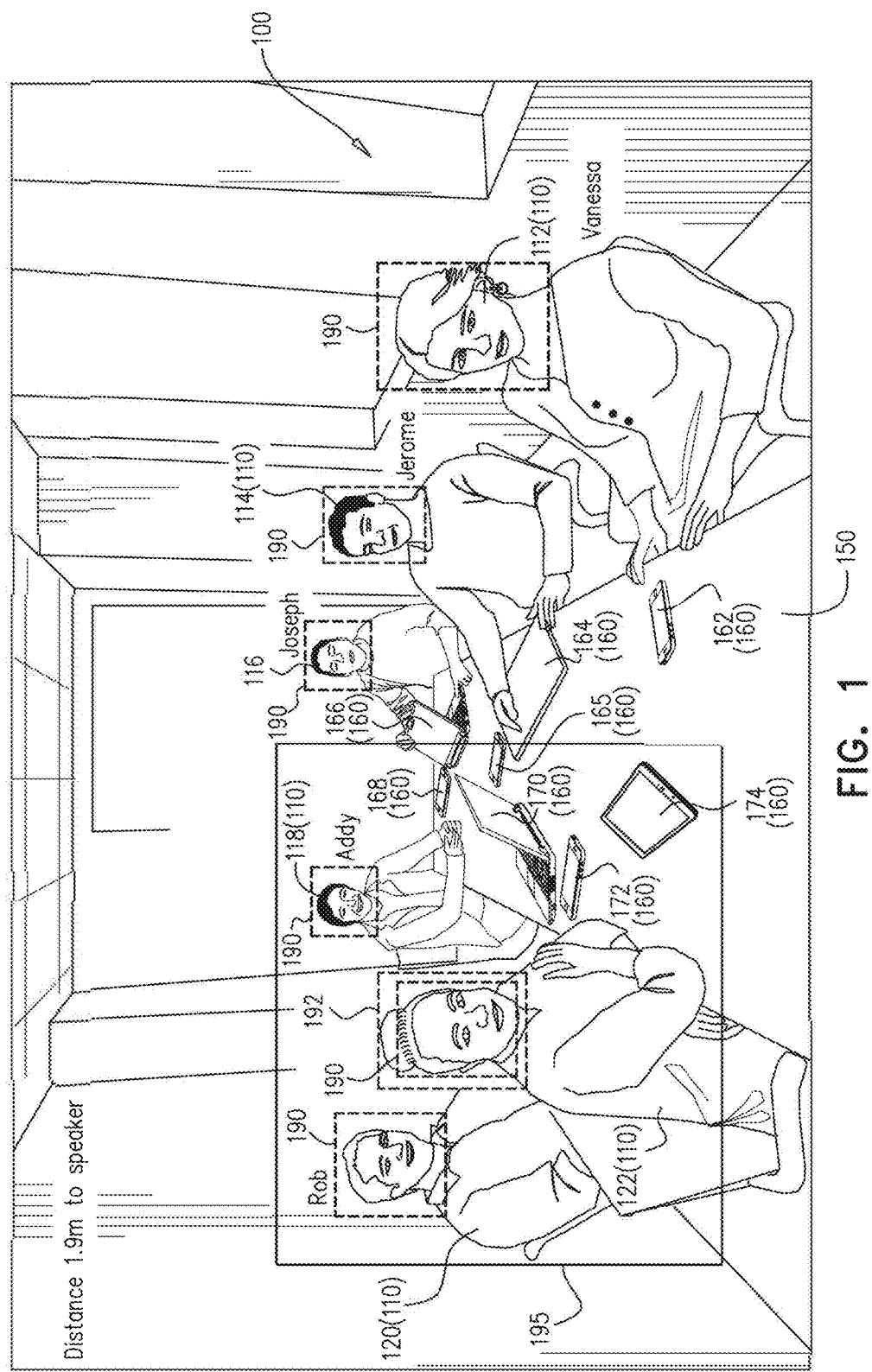
FIG. 1 is a view of a meeting room, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not necessarily depict all of the elements, stages, etc.

DESCRIPTION OF EXAMPLE EMBODIMENTS

Overview

In one example embodiment, an integration system obtains, based on data from a wireless location system, location data of a wireless device in a spatial area. The integration system determines location data of a person in the spatial area based on at least one image of the person captured by a camera. Based on the location data of the wireless device and the location data of the person, the integration system calculates a proximity parameter representing a spatial relationship between the wireless device and the person. Based on the proximity parameter, the integration system computes a probability of association between the wireless device and the person and determines, based on the probability of association, whether the person is a user of the wireless device.

DETAILED DESCRIPTION OF EXAMPLE EMBODIMENTS

Embodiments of the subject matter will be described with reference to certain technologies and certain environments. However, it should be understood that the principles of the subject matter may be applied to any appropriate technology which relates to computer vision being deployed and/or to wireless being deployed in any appropriate environment.

FIG. 1 is a view 100 of a meeting room, in accordance with some embodiments of the presently disclosed subject matter. Various wireless devices 160 are shown set on a table 150, namely smartphone 162, laptop 164, smartphone 165, laptop 166, smartphone 168, laptop 170, smartphone 172, and tablet 174. In the meeting room, wireless devices 160 may connect to a wireless network, such as an enterprise wireless network. For example, the wireless network may be a Wi-Fi network based on the Institute of Electrical and Electronics Engineers (IEEE) 802.11 standards, and wireless devices 160 may connect to the Wi-Fi network by way of any of two wireless access points (not shown) in the meeting room. The wireless network has access to records, e.g. records included in a database associated with secure access management such as the Cisco® Identity Services Engine (ISE). The records associate identifiers of wireless devices, such as media access control (MAC) addresses, with identifiers of wireless device users, such as user identifiers. There may be one or more identifiers per wireless device, and/or there may be one or more identifiers per user in the records. It is assumed that there are records for wireless devices 162, 164, 165, 166, 172, and 174, but not for wireless devices 168 and 170. For example, users may have registered wireless devices 162, 164, 165, 166, 172, and 174 to the wireless network, or in other words may have provided user identifiers when logging into the wireless network, thereby causing the corresponding records to be generated, whereas wireless devices 168 and 170 may not have been registered to wireless network, and therefore no corresponding records may have been generated.

The locations of the various wireless devices 160 may be determined by any appropriate wireless location system, e.g. which uses triangulation and/or any other technique for determining the locations of the various wireless devices 160. For example, the wireless location system (also referred to herein simply as a location system) may be a local positioning system such as a real time location system (RTLS) or a near real time location system (NRTLS) (e.g. Cisco Connected Mobile Experience (CMX)). Typically, although not necessarily, the accuracy of an RTLS or NRTLS may be within about 1 to 3 meters.

The wireless location system may be adapted to estimate the locations of the various wireless devices 160 based on the locations of radios associated with one or more wireless networks having coverage in the meeting room. For example, such radios may include wireless access points in the meeting room and/or wireless access points outside of the meeting room associated with a Wi-Fi network. Additionally, or alternatively, such radios may include radios associated with a Bluetooth® Low Energy network, and/or any other appropriate wireless network.

Six people 110 are shown in FIG. 1 seated around table 150, looking toward a camera (not shown) and a display (not shown). There may be more than one camera, and/or more than one display in the meeting room, and therefore reference to camera and display in the single form, should be understood to cover embodiments where there is a plurality of cameras and/or a plurality of displays, and embodiments where there is a single camera and/or a single display. For example, a computer vision system such as a Cisco Spark™ room system or Cisco TelePresence® system may include camera in a video endpoint. The video endpoint may also include display. View 100 may be a view that people 110 see on display, and/or a view seen on one or more displays outside of the meeting room, e.g. in one or more remote locations.

The camera may be adapted to capture images of the meeting room. The computer vision system may be adapted to detect faces based on one or more captured images. Detected faces are shown surrounded by dashed rectangles 190. In some cases, the computer vision system may also include a microphone. In such cases, the computer vision system may also be adapted to detect the speaker. The face of a person 122, detected to be speaking, is shown surrounded by an additional dashed rectangle 192.

For example, solid rectangle 195 shows the boundaries of an image captured by a camera when person 122 is speaking, which may be displayed on one or more displays, e.g. one or more displays in one or more locations remote from the meeting room. The image delineated by solid rectangle 195 is focused on person 222 who is speaking, and possibly on one or more other people 110 near person 122, for instance in order to reduce the transmission bandwidth requirements. In other embodiments, the computer vision system may not necessarily be adapted to detect faces.

The computer vision system may be adapted to use analytics (e.g. video analytics) to recognize people 110 (e.g. more specifically to recognize detected faces of people 110, clothing of people 110, and/or other characteristics of people 110), based on one or more captured images. The computer vision system may be adapted, consequently, to identify people 110 by identifiers, based on the one or more captured images. For example, the computer vision system may be adapted to compare the captured images (e.g. more specifically the detected faces) to reference representations of people (e.g. more specifically reference representations of faces), in order to recognize people 110 and identify such people 110 by name. Reference representations may include representations which are associated with identifiers (e.g. names) of people 110. Such representations may include any appropriate representations (such as images (e.g. pixel by pixel), patterns, features, etc.) relating to any appropriate characteristics of people 110 (e.g. faces, body shapes, clothing, etc.). In view 100, the names of Vanessa 112, Jerome 114, Joseph 116, Addy 118 and Rob 120 are shown. Identification (e.g. names) of people 110 may additionally or alternatively be used for other purposes besides display in view 100, e.g. for a unified meeting roster.

Person 122, however, is not shown named in view 100. For example, person 122 may not be named because the computer vision system may not have access to a reference representation of person 122. As another example, person 122 may not be named, even if the computer vision system has access to a reference representation of person 122, e.g. due to a change in appearance resulting in person 122 looking different than the reference representation; or e.g. because person 122 (e.g. more specifically the face of person 122) was not clearly captured by the camera, for instance due to person 122 not looking at the camera and/or being blocked from a line of sight of the camera; etc.

The computer vision system may be further adapted to detect locations of objects (e.g. people 110) based on images captured by the camera. For example, in FIG. 1, the distance between the camera and person 122, who is speaking is noted as being 1.9 meters.

Depending on the embodiment, any of the following, if performed by the computer vision system: face detection, people recognition, people identification, and/or location detection, may be performed by the camera, and/or may be performed within the computer vision system but external to the camera.

In view 100, the quantity of wireless devices 160 is larger than the number of people 110, because any of people 110 may have brought more than one wireless device 160 into the meeting room. There may additionally or alternatively be individuals among people 110 who do not bring wireless devices 160 into the meeting room.

The locations of wireless devices 160, as determined by the wireless location system and the locations of people 110, as determined by the computer vision system, may be compared, e.g. by calculating proximity parameters or in other words distance parameters between wireless device locations and people locations. Based on such comparisons, the probabilities of association between wireless devices 160 and people 110 may be determined, and identification may be provided for any individuals among people 110, that were not identified by the computer vision system and/or for any users of wireless devices among the wireless devices 160, that were not yet registered.

For example, the respective probabilities of association between wireless device 168 or 170, which is not yet registered, and the six people 110 shown in view 100, may be compared to one another and/or to a threshold. If a probability for a certain person 110, say person 118 or 120, is the highest and/or above the threshold and the certain person 110 has been identified by one or more identifiers (e.g. including the name Addy or Rob), e.g. by the computer vision system, then identification for the user of wireless device 168 or 170 may be provided. The provided identification may include at least one identifier (e.g. the name Addy or Rob) of the certain person 110. The identification (e.g. Addy or Rob) may be associated with one or more identifiers of wireless device 168 or 170 in a database relating to secure access management and/or any other database. For instance, a record in a database associated with secure access management may be generated for wireless device 168 or 170, thereby automatically registering wireless device 168 or 170 without requiring user input. Additionally or alternatively, the identification may be displayed on wireless device 168 or 170, if and when wireless device 168 or 170 is being logged into a wireless network, and therefore the user may not be required to input the identification, although perhaps may be required to input a password.

As another example, the respective probabilities of association between person 122, which has not been identified by the computer vision system, and the eight wireless devices 160 shown in view 100, may be compared to one another and/or to a threshold. If a probability for a certain wireless device 160, say wireless device 174, is the highest and/or above the threshold and the user of the certain wireless device 160 has been identified by one or more identifiers (e.g. including the name Alicia), e.g. based on a record associating identifiers of the certain wireless device 160 and the user, then identification for person 122 may be provided. The provided identification may include at least one identifier (e.g. the name Alicia) of the user of the certain wireless device 160. The identification (e.g. Alicia) may be associated with a reference representation of the person in a database, may be displayed when displaying an image of person 122, may be listed in a unified meeting roster, etc.

In either example, reference representations (of one or more persons 110) that are generated based on images captured by the camera may be stored; and/or probabilities of association may be stored. For example, a reference representation may be stored for a given person 110, if no reference representation is currently stored, if recognition of the given person 110 by computer vision system failed due to a change in appearance, etc.

Typically, although not necessarily, locations of people 110 and wireless device 160 at various points of time may be compared before the probabilities of association are sufficiently high (e.g. exceed one or more thresholds) to provide identification for one or more people 110 and/or one or more users of wireless devices 160.

Figure 2:
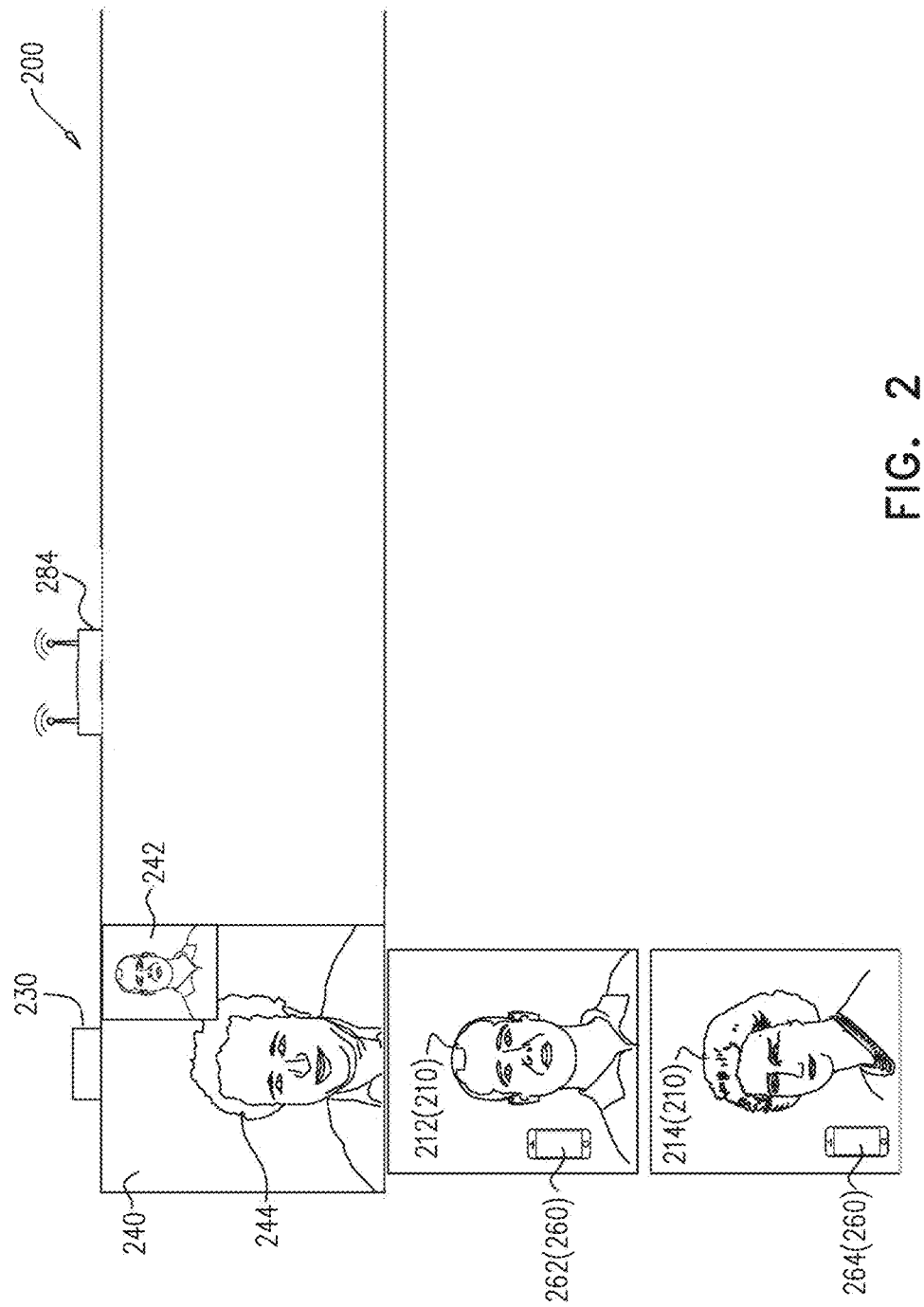
FIG. 2 is an illustration of a surveillance space, in accordance with some embodiments of the presently disclosed subject matter.

FIG. 2 is an illustration of a surveillance space 200, in accordance with some embodiments of the presently disclosed subject matter.

Surveillance space 200 includes a video endpoint, which includes a camera 230 and a display 240. Camera 230 is part of a computer vision system. Camera 230 is adapted to capture an image per person 210 in a queue, e.g. person 212 and person 214 in FIG. 2. The captured images may be viewed on one or more displays, such as on display 240 (e.g. in top right hand corner 242 of display 240), or on a display remote from surveillance space 200, e.g. which is monitored by security personnel or a remote lobby administrator. For illustration purposes, the lower section 244 of display 240, shows a remote lobby administrator. Persons 212 and/or 214 may be guests of the enterprise and may therefore receive temporary badges specifying identifying information, such as the names of persons 212 and 214, badge numbers, email addresses, etc.; or persons 212 and/or 214 may be employees of the enterprise and therefore may badge in, using previously issued badges specifying identifying information.

Reference representations of people 210 whose images were captured by camera 230 may be stored in association with the identifying information. Reference representations may relate to facial characteristics, body shape, clothing, other characteristics etc. Such a reference representation may be stored, for example, for a given guest or employee 210 (e.g. person 212 or 214) not having had a reference representation previously stored in association with identifying information, or for a given guest or employee 210 (e.g. person 212 or 214) who is not recognized based on the previously stored representation. The reference representation stored for a given person 210, or a previously stored reference representation of the given person 210 may be used for subsequent recognition of the given person 210 (e.g. subsequent recognition of the face of the given person 210) based on images captured by other cameras included in the computer vision system. Such other cameras may be placed in other surveillance spaces, e.g. of the enterprise. Because of the stored identifying information of the given person 210, the given person 210 may be identified by the stored identifying information based on the images captured by the other cameras, and the identifying information may be used to label the given person 210, e.g. in a display displaying an image of the given person 210 which is monitored by security personnel. Additionally, or alternatively, as the given person 210 badges-in at further surveillance spaces, e.g. of the enterprise, the given person 210 may be identified by stored identifying information (e.g. stored on the badge and/or in at least one database), based on the images captured by the other cameras without necessarily using a reference representation of the given person 210. Such identifying information may be provided, e.g. to security personnel.

In FIG. 2, persons 212 and 214 are shown holding wireless devices 260, namely smartphones 262 and 264 respectively, which are not registered to a wireless network in surveillance space. For example, the wireless network may be an enterprise Wi-Fi network. A wireless access point 284 for the wireless network is shown in surveillance space 200. A wireless location system may estimate the locations of smartphones 262 and 264, based on the locations of radios, e.g. radios including wireless access point 284, one or more other wireless access points associated with a Wi-Fi network, and/or one or more radios associated with a Bluetooth Low Energy network.

Computer vision system (e.g. more specifically camera 230 and/or other cameras in the computer vision system) may be adapted to determine the various locations of a given person 210 as images are captured by camera 230 and the other cameras.

The various locations of wireless devices 260 as determined by the wireless location system and the locations of people 210, as determined by the computer vision system, may be compared, e.g. by calculating proximity parameters between wireless device locations and people locations. Based on such comparisons, the probabilities of association between wireless devices 260 and people 210 may be determined, and identification for the users of smartphones 262 and 264, including respective identifying information of people 212 and 214, may be provided. Typically, although not necessarily, locations at various points of time, e.g. as people 212 and 214 walk around the enterprise, may be compared before the probabilities of association are sufficiently high (e.g. exceed one or more thresholds) to provide identification for the users of smartphones 262 and 264.

In a subsequent visit to surveillance space 200, by a particular person 210, such as person 212, after person 212 has changed appearance so that the computer vision system does not recognize person 212, the probability of association between person 212 and smartphone 262 may be determined based on comparison between locations of smartphone 262 and person 212, and the previous provided identification for the user of smartphone 262 may now be provided as identification for person 212.

Figure 3:
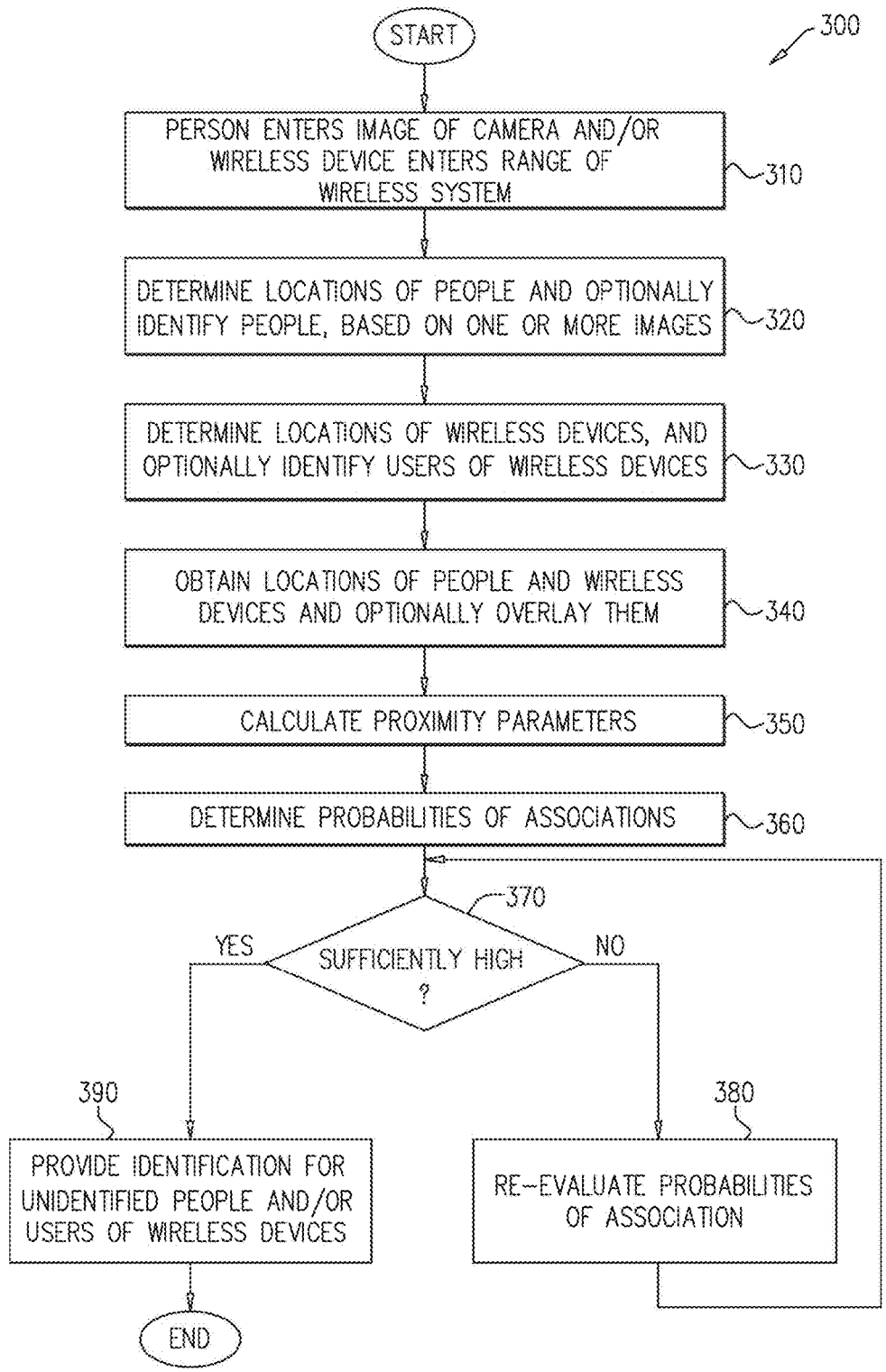
FIG. 3 is a flowchart of a method for providing identification, in accordance with some embodiments of the presently disclosed subject matter.

FIG. 3 is a flowchart of a method 300, in accordance with some embodiments of the presently disclosed subject matter.

FIG. 3 will be discussed with reference to a computer vision system, a wireless system, and an integration system. The computer vision system may be at least adapted to capture images of people, determine the locations of the people based on the images, and identify the people based on the images. The wireless system may comprise one or more wireless networks (e.g. including radios), a wireless location system adapted to locate wireless devices, and a database associated with secure access management. At least one of the one or more wireless networks may be adapted to access the database associated with secure access management in order to identify users of wireless devices. The integration system may be adapted to provide identification for people not identified by the computer vision system and/or for users of wireless devices not identified by the wireless system. Such systems are functional and therefore may be implemented separately or may share hardware and/or software (also referred to herein as computer readable code). For example, the integration system may share hardware with the computer vision system and/or with the wireless system; or may have independent hardware. Software, or computer readable code, when mentioned herein, may include firmware. Examples of implementations of such systems are provided further below with reference to FIG. 10.

In stage 310, a person enters at least one image captured by at least one camera that is included in a computer vision system. For example, the at least one camera may include auto-zooming to detect moving objects. Additionally, or alternatively, a wireless device, e.g. used by the person, enters the range of a wireless system. For example, the computer vision system and the wireless system may be associated with a particular enterprise. The person, for example, may enter a meeting room carrying the wireless device, for a meeting with other people. As another example, the person may enter a lobby of an enterprise carrying the wireless device.

In stage 320, the computer vision system detects the location of the person and optionally identifies the person, based on the at least one image captured by at least one camera. For example, when the person enters a meeting room or a lobby, along with the other people, the computer vision system (e.g. at least one camera included in the computer vision system that are in the meeting room or lobby), may detect the location of each person, based on at least one image captured at least one camera in the meeting room or lobby. The computer vision system may identify one or more of the people by one or more identifiers, based on the at least one captured image. For instance, the computer vision system may use analytics to recognize one or more of the people, based on the at least one captured image and based on reference representations of the people to which the computer vision system has access. The computer vision system may have access to a reference representation of a given person such as an image of the given person, including the face, or to a list of facial features of a given person that was generated from an image. Other examples of reference representations were described above. The computer vision system may then identify the recognized person by one or more identifiers. Additionally or alternatively, the computer vision system may, for instance, identify the given person by one or more identifiers based on the at least one captured image if the given person badges in. However, the computer vision system may fail to identify one or more of the people in the meeting room or lobby, e.g. due to lack of access to reference representations of the one or more people, change in appearance of the one or more people, one or more people not badging in, and/or the one or more people not clearly captured in the at least one image.

Figure 4:
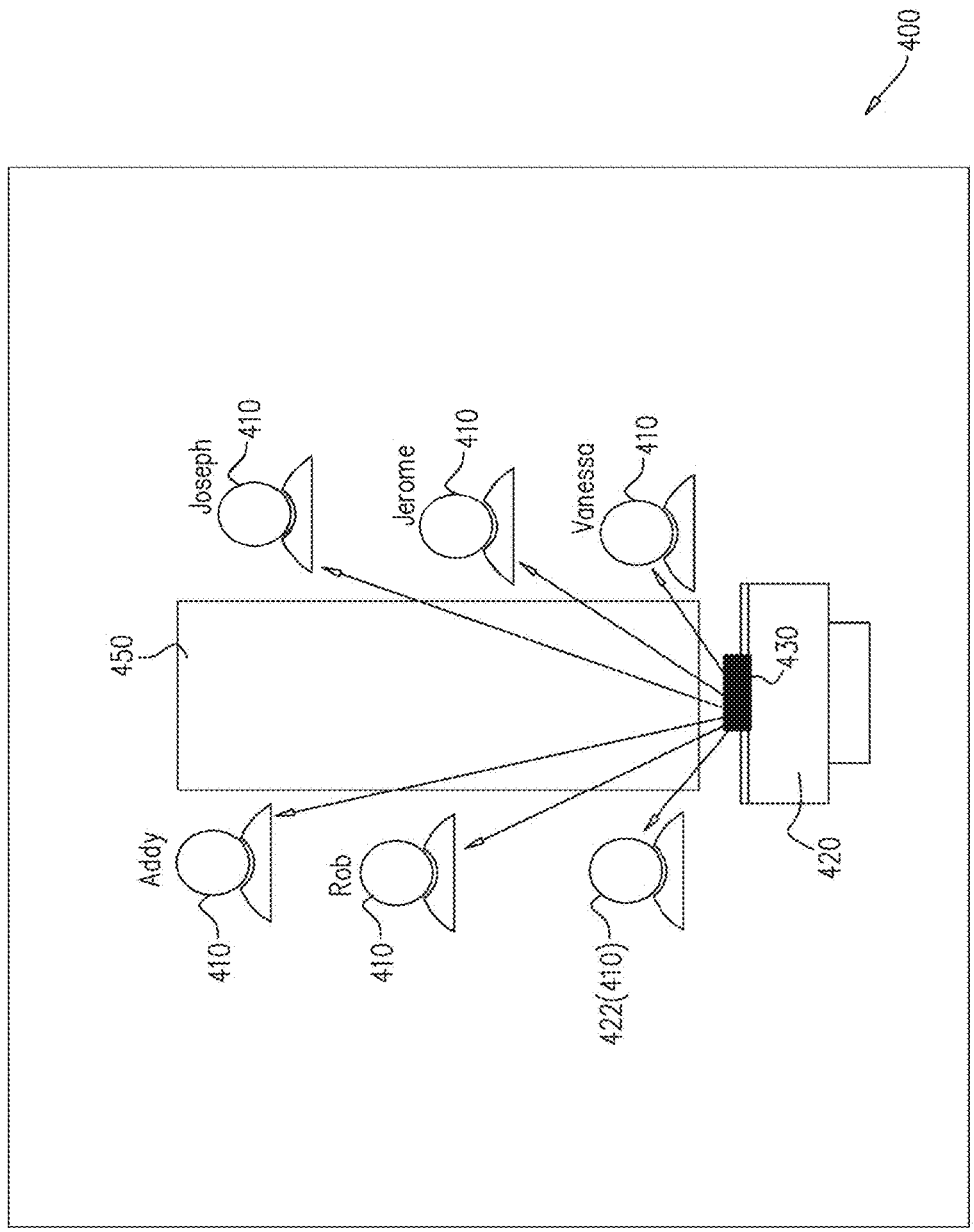
FIG. 4 is an illustration of the meeting room discussed with reference to FIG. 1, in accordance with some embodiments of the presently disclosed subject matter.

Reference is now made to FIG. 4 which is an illustration 400 of the meeting room discussed with reference to FIG. 1, in accordance with some embodiments of the presently disclosed subject matter.

The meeting room includes a video endpoint 420, the video endpoint including a single camera 430, as shown in FIG. 4. The meeting room further includes a table 450. Also shown in FIG. 4 are arrows representative of the line of sight of camera 430 in video endpoint 420 to the various (flattened) people 410 in the meeting room. The lengths of the arrows are representative of the distances between the various people 410 in the meeting room and camera 430 in video endpoint 420. Names of all of the people are shown in FIG. 4, except person 422 who is unidentified.

Returning to the description of FIG. 3, in stage 330, the wireless system estimates a location for a wireless device which entered the range of the wireless system, and optionally identifies the user of the wireless device. For example, with reference to a meeting room or a lobby, typically although not necessarily, a person will enter the meeting room or the lobby with one or more wireless devices, e.g. adapted to communicate wirelessly. The meeting room or lobby may include other people, each with one or more respective wireless devices. The wireless system, e.g. more specifically the wireless location system such as a local positioning system (e.g. RTLS or NRTLS) in the wireless system, may estimate the location for each detected wireless device. The user of a wireless device may be identified by one or more identifiers, based on the wireless device identification (e.g. MAC address) and user identification included in a record of the wireless system, e.g. more specifically a record in a secure access management database such as ISE. However, the wireless system may fail to identify one or more users of one or more of the wireless devices in the meeting room or lobby, if the one or more wireless devices were not registered.

Figure 5:
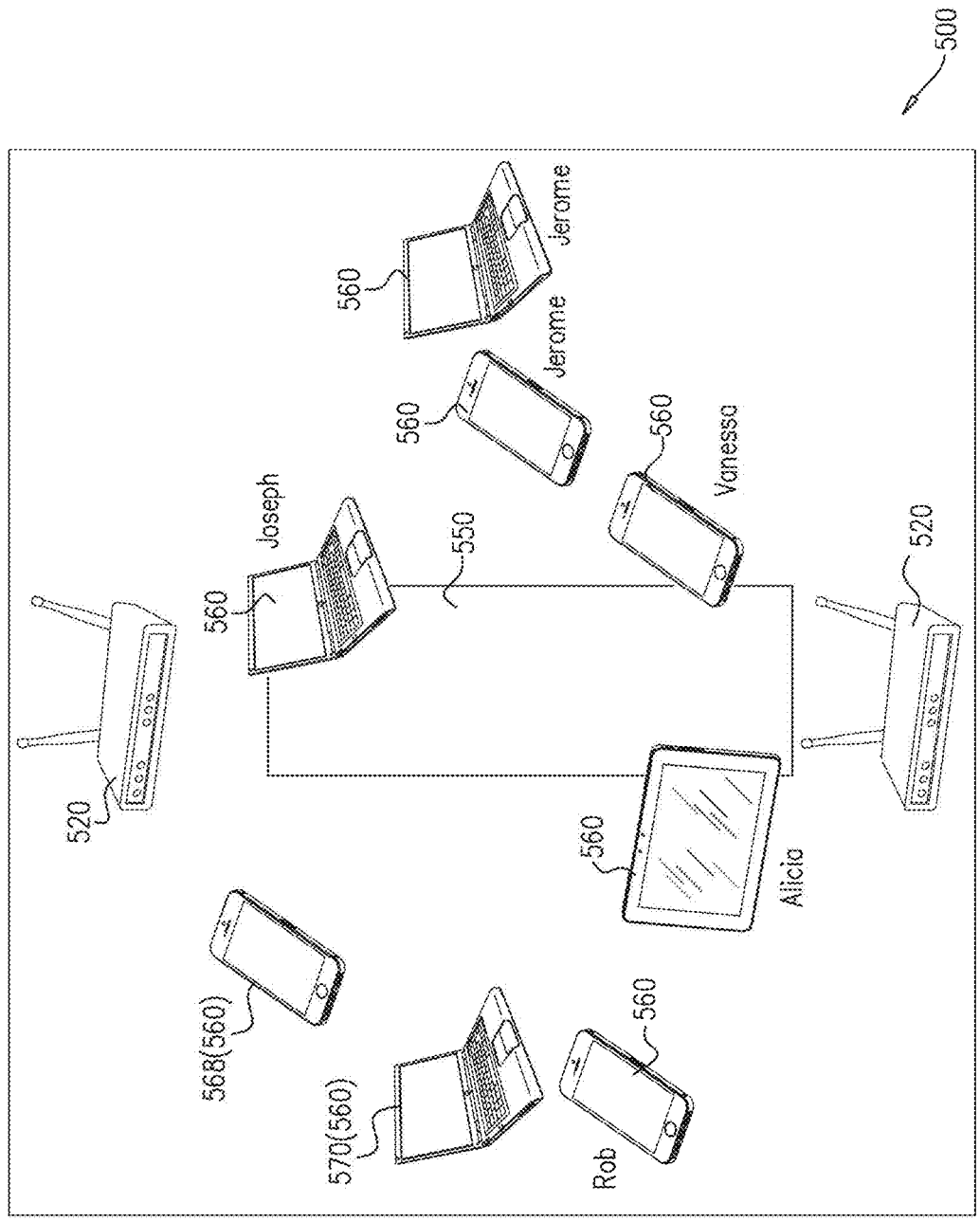
FIG. 5 is another illustration of the meeting room discussed with reference to FIG. 1, in accordance with some embodiments of the presently disclosed subject matter.

Reference is now made to FIG. 5 which is another illustration 500 of the meeting room discussed with reference to FIG. 1, in accordance with some embodiments of the presently disclosed subject matter.

Figure 7:
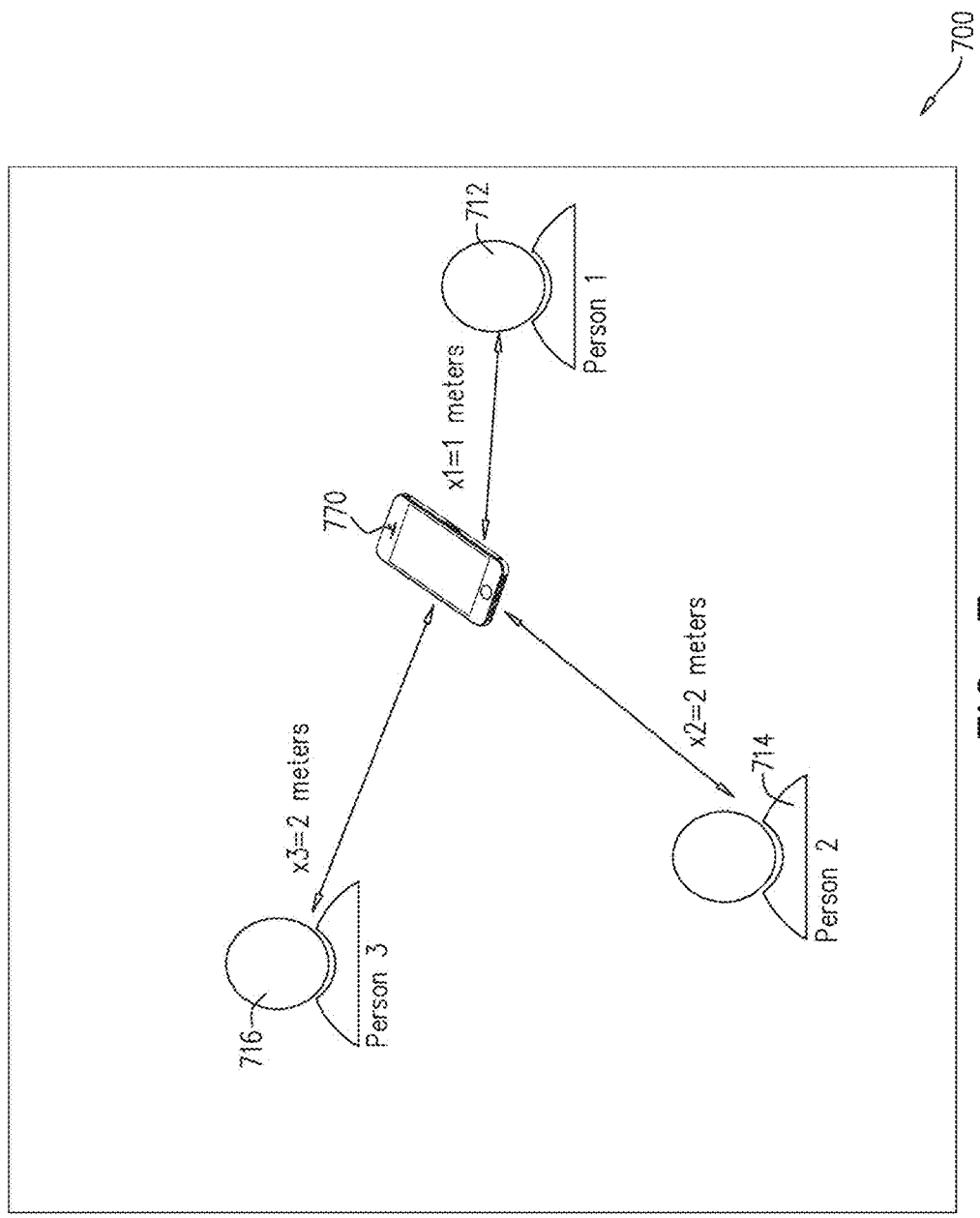
FIG. 7 is an illustration of Euclidean distances, in accordance with some embodiments of the presently disclosed subject matter.

The meeting room includes two wireless access points 520 that are included in a Wi-Fi network of the wireless system, as shown in FIG. 5. The meeting room further includes a table 550. The various wireless devices 560 in the meeting room may communicate with wireless access points 520. Based on the communications, and optionally communications with other wireless access points, the wireless location system included in the wireless system, may estimate the locations thereof. It is noted that the estimated locations of the various wireless devices 560 do not necessarily coincide with the space occupied by table 550 in the meeting room, even though, as shown in FIG. 1, the wireless devices are in actuality on the table. For instance, the estimated locations may not necessarily coincide with the space occupied by the table, if the accuracy of the location system is within about 1 to 3 meters, or any other appropriate range, rather than being exact. The names of the users of wireless devices 560 are shown in FIG. 7, except the names of the users of wireless devices 568 and 570 who are unidentified.

Returning to the description of FIG. 3, the remaining stages of method 300 may relate to the integration of computer vision data (e.g. location and/or identification data determined by the computer vision system) and wireless data (e.g. location and/or identification data determined by the wireless system). In stage 340, the determined location of the wireless device as determined in stage 330, may be overlaid with the determined location of the person, as determined in stage 320. For example, an integration system may perform stage 340. The integration system may obtain the detected location (detected in stage 320). For instance, the computer vision system may provide the estimated location of the person on a 2-D (flattened) map of the room, or the integration system may form a 2-D map from location data provided by the computer vision system. The integration system may obtain the estimated location of the wireless device from the wireless system. The integration system may obtain an identity of the person, if identified, from the computer vision system, and an identity of the user of the wireless device, if identified, from the wireless system. Determined locations of other people and other wireless devices may also be obtained and overlaid. It is noted that if a given person is standing up (e.g. in a lobby, in a standup meeting room, in a corridor, in order to present. etc.), or even sitting down, the face of the person may be expected to be located at a larger z coordinate than a wireless device used by the person (e.g. if the wireless device is on a table, in a hand of the given person, in a pocket or purse of the given person, etc.).

Although stage 340 refers to obtaining by the integration system, reference herein to obtaining the location and optionally the identity of a person, may additionally or alternatively refer to the computer vision system determining the location and optionally identifying the person (stage 320); and/or reference to obtaining the location of the wireless device and optionally the identity of the user of the wireless device may additionally or alternatively refer to the wireless system determining the location and optionally identifying the user of the wireless device (stage 330). In some embodiments, the overlaying may be omitted, if the calculation stage (to be described below-stage 350) may be performed regardless.

Referring now to a meeting room, such as shown in FIGS. 4 and 5, which is an example of an area, the locations of the various people in the meeting room, and the locations of the various wireless devices in the meeting room may be overlaid. With reference to a lobby, the various people in the lobby, which is an example of area, and the estimated locations of the various wireless devices in the lobby may be overlaid.

Figure 6:
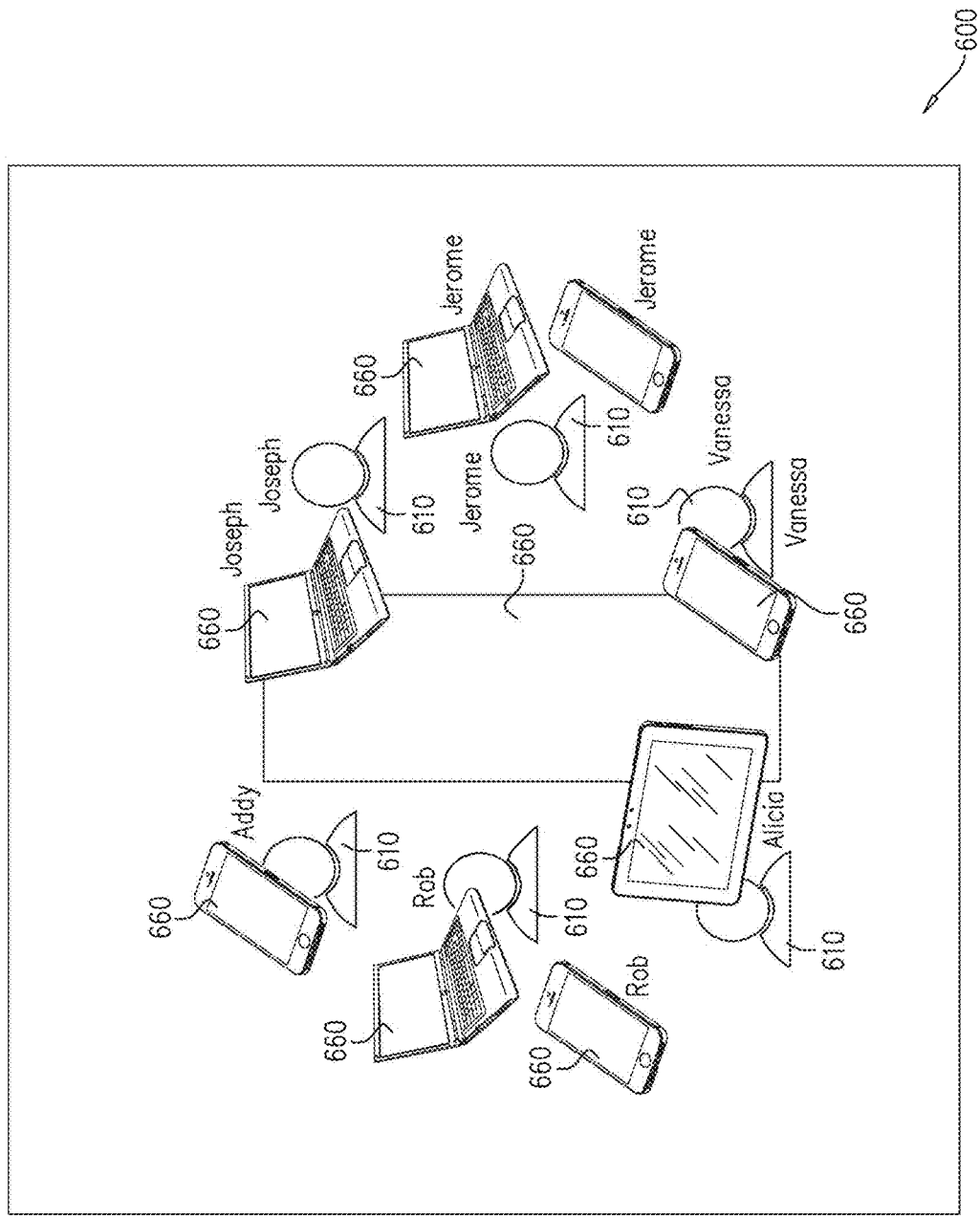
FIG. 6 is yet another illustration of the meeting room discussed with reference to FIG. 1, in accordance with some embodiments of the presently disclosed subject matter.

Reference is now made to FIG. 6 which is another illustration 600 of the meeting room discussed with reference to FIG. 1, in accordance with some embodiments of the presently disclosed subject matter. Illustration 600 is a combined two dimensional map. The locations of the faces 610 of the various people in the meeting room are flattened (e.g. z coordinate removed) and presented in combined two dimensional map 600 along with the locations of the various wireless devices 660 of the meeting room. It is noted that the locations of the various wireless devices 660 are not necessarily shown as being co-located with a table 650 of the meeting room, as explained above with reference to FIG. 5.

Returning to the description of FIG. 3, in stage 350, proximity parameters for the various wireless devices and various people in the area are calculated by the integration system. For example, the Euclidean distances between the various wireless devices and various people may be calculated, e.g. from a combined two dimensional map, such as the combined two dimensional map shown in FIG. 6. It is noted that a stationary wireless device (e.g. a persistent device) may be excluded from the analysis, if the wireless system does not estimate the location of a wireless device that is stationary.

For simplicity's sake, an example is now described for calculating the Euclidean distances with reference to a given wireless device and n people in a meeting room. The Euclidean distance between the given wireless device and each person may be determined as:

x1=Euclidean distance to person 1
x2=Euclidean distance to person 2
.
.
.
xn=Euclidean distance to person n A similar procedure, may be performed for m wireless devices. For example, for m wireless devices the procedure may repeated for each i device from 1 to m and each j person from 1 to n, where Xij is the Euclidean distance between wireless device i and person j.

Reference is now made to FIG. 7 which is an illustration 700 of Euclidean distances, in accordance with some embodiments of the presently disclosed subject matter. The distances x1=1 meter, x2=2 meters, and x3=2 meters between a given wireless device 770 and person 1 712, person 2 714, and person 3 716 respectively, are shown in FIG. 7.

Returning to the description of FIG. 3, in some embodiments, any other appropriate proximity parameters representing a spatial relationship between a wireless device and a person may be used in addition to or instead of Euclidean distances. For example, three dimensional distance, mean square distances, etc., may be used. Moreover, the proximity parameter may indicate an orientation and/or relative positioning of the wireless device and/or person.

In stage 360, likelihoods (also referred to herein as probabilities) of association are determined by the integration system, based on proximity parameters calculated in stage 350. Likelihoods of association, for example, may be calculated with respect to any wireless device that has not been identified by the wireless system, and/or for any person that has not been identified by the computer vision system, in order to provide identification for such wireless device(s) and/or person(s). In another example, likelihoods of association may also be calculated with respect to at least one wireless device and/or person that has been previously identified by the wireless system and computer vision respectively, e.g., in order to validate the previous identification.

Assuming, for instance, that there are n people in an area (e.g. in a meeting room or a lobby) the probability that a given wireless device is associated with person "j" may be calculated as follows:

$$P(\text{Device} \rightarrow j) = \left(\frac{1}{n-1}\right) \cdot \left(1 - \frac{xj}{x1 + x2 + x3 \ldots xn}\right) \quad \text{(eqn. 1)}$$

Referring to the Euclidean distances show in FIG. 7, for instance, an initial probability of association between a wireless device ("device" or "D") and each person may be determined using equation 1 as:

$P1(D \rightarrow \text{person } 1) = 0.4 (40\% \text{ chance of association})$

P1(D→person 2)=0.3(30% chance of association)

P1(D→person 3)=0.3(30% chance of association)

Where "P1" may indicate the first iteration in a probability calculation learning machine (also referred to herein as a statistical learning machine). Such a machine may comprise, for example, at least one processor in the integration system.

Figure 8:
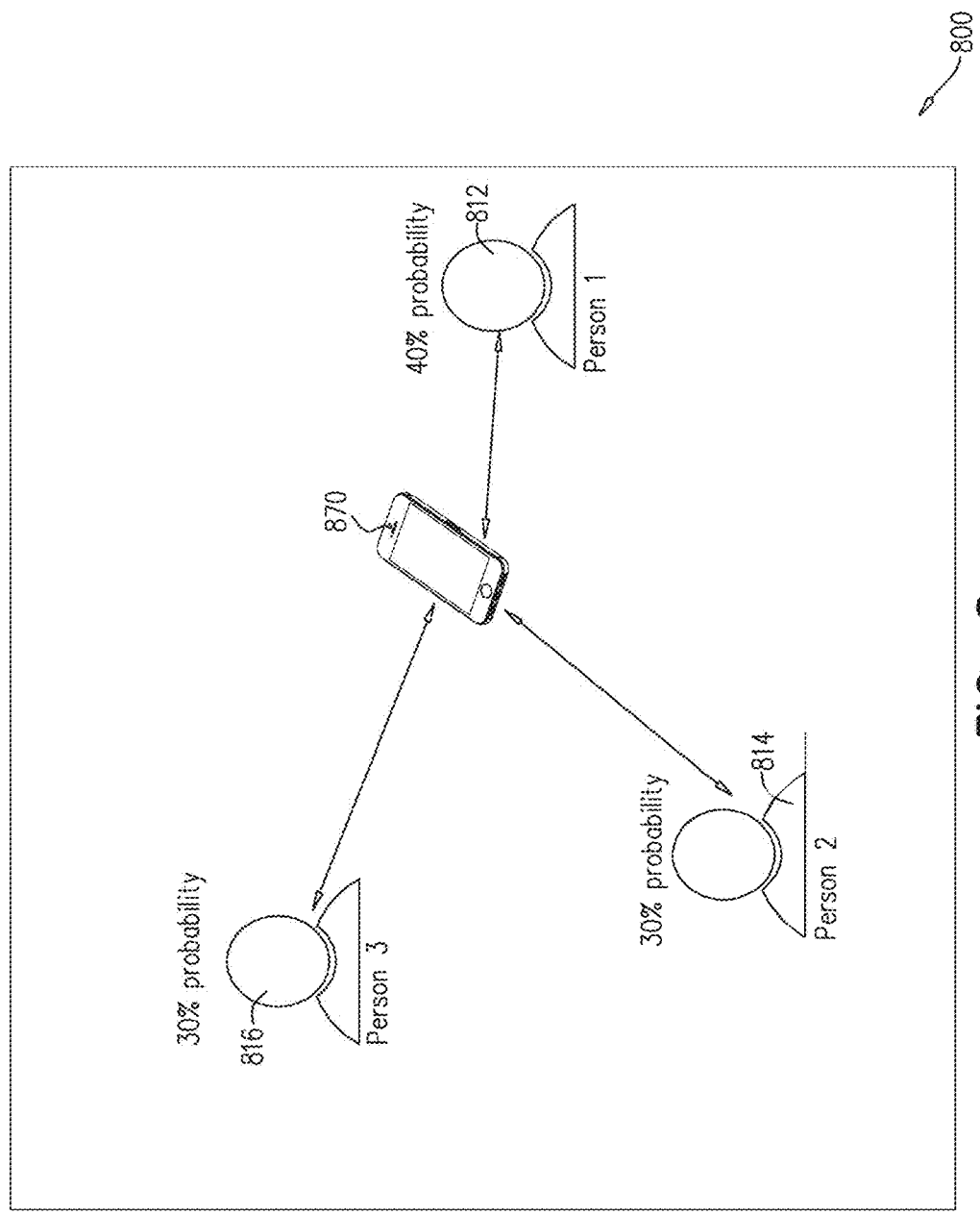
FIG. 8 is an illustration of probabilities of association from a first iteration, in accordance with some embodiments of the presently disclosed subject matter.

Reference is now made to FIG. 8, which is an illustration 800 of probabilities of association from a first iteration, in accordance with some embodiments of the presently disclosed subject matter. The probabilities of 40%, 30% and 30% with respect to a given wireless device 870 and person 1 812, person 2 814 and person 3 816 respectively, are shown in FIG. 8.

With reference to FIGS. 7 and 8, it will be understood that a similar calculation of proximity parameters (e.g. Euclidean distances: x1=1 meter, x2=2 meters, and x3=2 meters) may be performed with respect to a given person and various wireless devices (e.g. three wireless devices), resulting in probabilities of association between the given person and the various wireless devices (e.g. P1 (person→device 1)=0.4 (40% chance of association), P1 (person→device 2)=0.3 (30% chance of association) and P1 (person→device 3)=0.3 (30% chance of association)).

Returning to the description of FIG. 3, in stage 370, it is determined by the integration system if one or more respective probabilities of association are sufficiently high to provide identification for one or more users of wireless devices that have not been identified by the wireless system, and/or to provide identification for one or more people that have not been identified by the computer vision system.

For example, based on initial probabilities of P1(D→person 1)=0.4, P1(D→person 2)=0.3, and P1(D→person 3)=0.3, it may be inferred that person 1 is likely to be the user of the given wireless device. However, such an initial probability may not be sufficiently high to provide with a high level of confidence, an identifier of person 1 as identification for the user of the given wireless device. Similarly, based on initial probabilities of P1 (person→device 1)=0.4), P1(person→device 2)=0.3 and P1 (person→device 3)=0.3, it may be inferred that the user of wireless device 1 is likely to be the given person. However, such an initial probability may not be sufficiently high to provide with an acceptable level of confidence an identifier of the user of the wireless device as identification for the given person. For example, an acceptable level of confidence may be a 90% or higher probability; or may be any appropriate threshold or higher. The threshold may be configurable. Each of the probabilities, for instance, may be compared to the threshold, or, for instance, the highest among the probabilities may be compared to the threshold, in order to determine whether there is an acceptable level of confidence, or in other words whether there is a sufficiently high probability of association.

If there is a probability of association that is sufficiently high to provide identification for a given person or user of a given wireless device, method 300 may skip to stage 390 for the given person or given wireless device. If there is not a probability of association that is sufficiently high to provide identification for a particular person or user of a particular wireless device, method 300 may continue to stage 380 for the particular person or particular wireless device.

In stage 380, likelihoods of association are re-evaluated by the integration system (e.g. more specifically by the statistical learning machine in the integration system). Stage 380 may be repeated for any given person or wireless device until the likelihood of association is sufficiently high to provide in stage 390 identification for the given person or user of the given wireless device.

For example, the locations of wireless devices or people in an area which includes a given person or wireless device may be re-evaluated at regular intervals (e.g. 3 or 4 times per minute, 15 samples per half an hour, etc.), and/or upon a triggered event. Any location change (or any substantial location change, e.g. beyond the accuracy level of the location determination) may then trigger a new determination of proximity parameters and probabilities of association. The area may be fixed during the re-evaluations (e.g. a meeting room), or may be modified as the given person which is to be identified or the given wireless device whose user is to be identified moves (e.g. from the lobby to other locations within an enterprise). In the case of a modifiable area, the size of the area around the location of the given person or wireless device, may be dependent on the location accuracy of the location system and/or of the computer vision system; and/or may be dependent on any other appropriate factors. Triggered events may include for instance, people and/or wireless devices entering the area, people and/or wireless devices leaving the area, people and/or wireless devices moving within the area, and/or people sitting down and/or standing up in the area, determined locations changing, etc. Entrance, exit, movement, standing up, sitting down, may be detected, for instance, by the computer vision system (e.g. more specifically, by any camera of the computer vision system). It is noted that changes in the determined locations may occur as a result of actual movement and/or as a result of inaccuracies in location determination.

Further probability calculations may be executed and combined with the initial probability calculation (from stage 360), in order to determine re-evaluated probabilities of association. The statistical learning machine may combine new data with the existing information using, for instance, Bayesian Inference/Statistical Learning. Any other form of probabilistic inference (also referred to as progressive statistical learning) may be additionally or alternatively used.

For example, the next determination of proximity parameters such as Euclidean distances with respect to a given wireless device may include the following data: x1=1 meter Euclidean distance between the given wireless device and person 1, x2=4 meters Euclidean distance between the given wireless device and person 2, and x3=4 meters Euclidean distance between the given wireless device and person 3. Therefore, the probabilities of association using equation 1 may be determined for a given wireless device as P2(D→person 1)=0.44 (44% chance of association), P2(D→person 2)=0.28 (28% chance of association), and P2(D→person 3)=0.28 (28% chance of association), assuming the distances were determined between the given wireless device and each of three people, where "P2" indicates the second recursion in the statistical learning machine. Similarly, probabilities of association for a given person may be determined as P2 (person→device 1)=0.44 (44% chance of association) P2(person→device 2)=0.28 (28% chance of association), and P2(D→person 3)=0.28 (28% chance of association), assuming the distances were determined between the given person and each of three wireless devices. Such probabilities do not take into account previously computed probability data.

Using the newly determined probability information, the probabilities of association for the second iteration, which take into account previously computed probability data, may be calculated by the statistical learning machine combining the newly determined probability information with the initial probability determination, using an equation of progressive statistical learning. The second iteration that the given wireless device is associated with person 1 may be calculated as follows:

$$P2'(Dev \to \text{Person 1}) = \left( \frac{P2(D \to 1) \times P1(D \to 1)}{\begin{array}{l} P2(D \to 1) \times P1(D \to 1) + \\ P2(D \to 2) \times P1(D \to 2) + \\ P2(D \to 3) \times P1(D \to 3) \end{array}} \right) \quad \text{(eqn. 2)}$$

Plugging in the probabilities from above two recursions of equation 1 into equation 2, the probability of association between the given wireless device and person 1 may be re-evaluated as:

$$P2'(Dev \to \text{Person 1}) = \left( \frac{0.44 \times 0.40}{0.44 \times 0.40 + 0.28 \times 0.3 + 0.28 \times 0.3} \right)$$

Resulting in P2'=0.511, or 51.1%

In other words, the probability of association with respect to the given device for person 1 has now gone up from 40% to 51%, demonstrating that the second iteration has improved the confidence level considerably. Similar equations to equation 2 may be applied for persons 2 and 3, resulting in a 24.5% probability that the given device is associated with person 3 or person 2.

Figure 9:
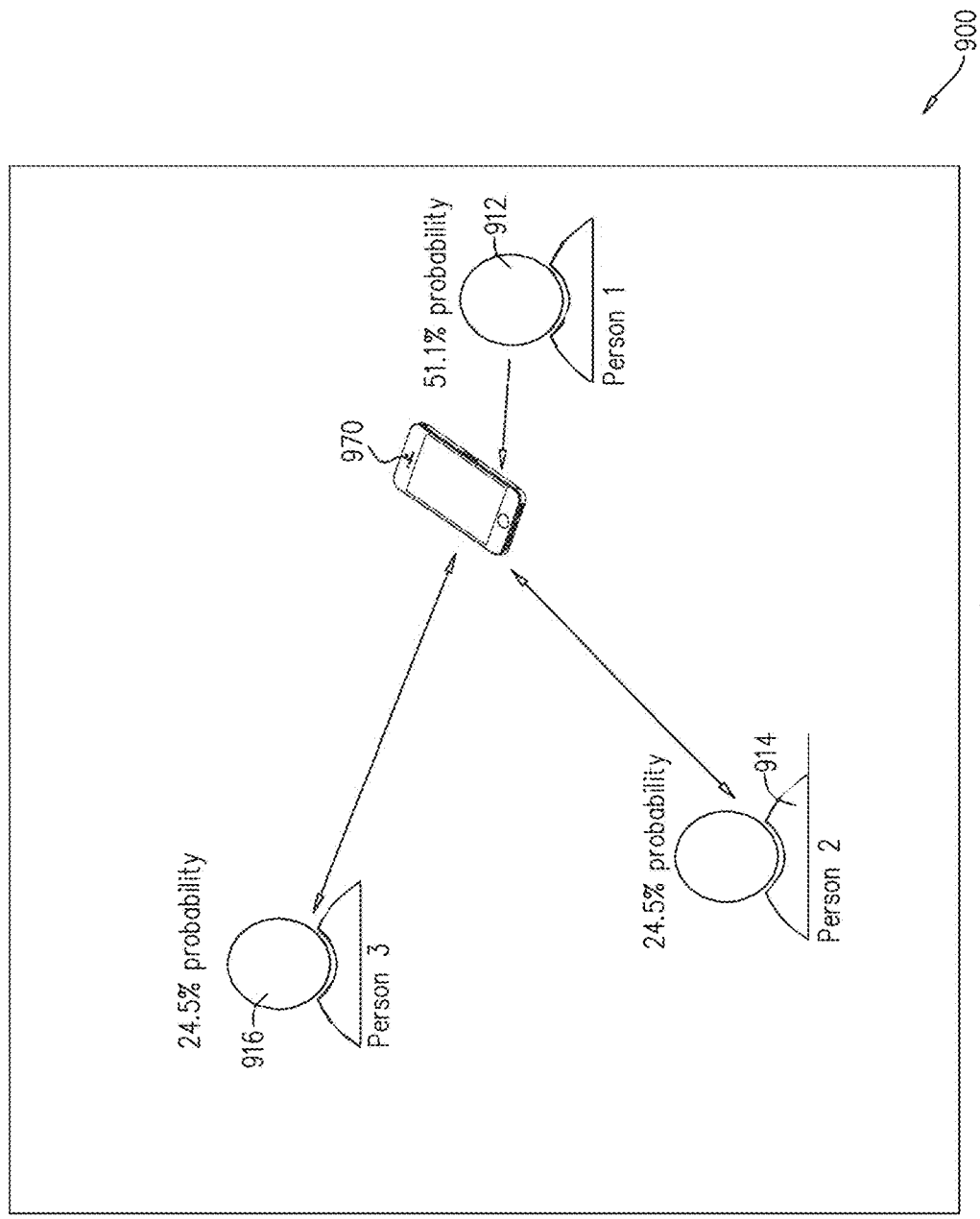
FIG. 9 is an illustration of probabilities of association from a second iteration, in accordance with some embodiments of the presently disclosed subject matter.

Reference is now made to FIG. 9, which is an illustration of probabilities of association from a second iteration, in accordance with some embodiments of the presently disclosed subject matter.

As shown in FIG. 9, the probability that person 1 912 is associated with the given wireless device 970 has gone up to 51.1% in the second iteration (compared to 40% in the first iteration, as shown in FIG. 8). The probability that either person 2 914 or person 3 916 is associated with the given wireless device 970 has gone down to 24.5% (compared to 30% in the first iteration, as shown in FIG. 8).

It will be understood that a similar next determination of proximity parameters (e.g. Euclidean distances: x1=1 meter, x2=4 meters, and x3=4 meters) with respect to a given person and various wireless devices (e.g. three wireless devices), and a similar calculation of probability of association with respect to a given person and various wireless devices may be performed. Such a performance may result in the probability of association with respect to the given person and wireless device 1 going up from 40% to 51.1% (decreasing to a 24.5% probability that the given person is associated with wireless device 3 or wireless device 2).

If the probabilities of association after the second iteration are insufficiently high to provide identification, additional iterations may be performed over time, re-evaluating probabilities by combining (e.g. in equation 2), previously computed probabilities with new probabilities (e.g. computed using equation 1). Respective re-evaluated probabilities may continue to increase and decrease until the algorithm converges beyond a threshold and it may be strongly inferred that a particular wireless device is associated with a particular person. For example, when the probability of the statistical learning machine reaches an acceptable level (e.g. 90% or higher; or any other appropriate threshold or higher), it may be assumed that a particular wireless device is associated with a particular person and the algorithm has converged sufficiently to provide identification for a user of the particular device or for the particular person.

The example detailed with reference to equations 1 and 2, assumed the same people in the area when performing both iterations with respect to the given wireless device; and/or the same wireless devices in the area when performing both iterations with respect to the given person. However, such an assumption may not necessarily be applicable, e.g. if the people and/or wireless devices in an area change; and/or e.g. if the area, as set to include the location of a given wireless device or person, changes, as the given wireless device or person moves. In the event of certain people and/or wireless devices being or not being in a fixed or changing area for different iterations, probabilities for the certain people and/or wireless devices in some iterations of equation 2 may be zero (corresponding to the certain people and/or wireless devices not being in the fixed or changing area and consequently probabilities not being calculated, or calculated as zero); and in other iterations the probabilities may be non-zero (corresponding to the certain people and/or wireless devices being in the fixed or changing area).

In stage 390, the integration system may provide identification for one or more users of wireless devices, not identified by the wireless system, and/or identification for one or more people, not identified by the computer vision system. For example, the identification of a person may include one or more identifiers of a user of a wireless device associated with the person with a sufficiently high probability. The provision may include, for instance, the integration system (and/or the computer vision system and/or the wireless system) providing the identification of the person for association with at least one reference representation of the person in at least one database, providing the identification of the person for display when one or more images of the person are being displayed, providing the identification of the person for listing in a unified meeting roster; and/or any other appropriate actions. As another example, the identification of a user of a wireless device may include one or more identifiers of a person associated with the wireless device with a sufficiently high probability. The provision may include, for instance, the integration system (and/or the computer vision system and/or the wireless system) providing the identification for association with one or more identifiers of the wireless device in at least one database; providing the identification for display on the wireless device, such that the identification is displayed when the wireless device is being logged onto a wireless network; and/or any other appropriate actions.

In some embodiments, once a probability of association with respect to a person is sufficiently high, a reference representation of the person may be generated and mapped to the identity of the user of the wireless device which was associated with the person, at a sufficiently high probability. For example, the computer vision system (e.g. more specifically a camera in the computer vision system) may capture an image of the person (e.g. the face of the person) and the computer vision system may learn the features of the person (e.g. the face of the person) from the image. The features may then be mapped to the identity of the user of the device which was associated with the person, at a sufficiently high probability. The reference representation and identity of the person may then be stored in association in a database, e.g. which may be used by the computer vision system. A generated reference representation may be an initial reference representation of the person or may be an updated reference representation of the person. Alternatively, a reference representation may not be generated and stored, e.g. if the database already includes a reference representation of the person, the failure of the computer vision system to identify the person was not due to a change in appearance, and/or the identity of the person has not changed from a previous recording in the database but the database is just being updated for a changed probability of association calculated by the algorithm. A record for the person in the database may include any of the following fields: (1) A reference representation which may be used for analytics (e.g. video analytics) by the computer vision system in performing recognition (e.g. facial recognition) (2) identity of the person (e.g. one or more identifiers of the person such as the name of the person) which may be used to identify the person and/or (3) a probability of association calculated by the algorithm. Other appropriate fields are optionally included in the record.

The identification of the person may be used to label the person, for instance, in video conferencing, in video surveillance, etc. The label may be displayed when displaying an image of the person. In video surveillance, the computer vision system may link a moving person detected on camera to the identity of the person at all times. For example, a central monitoring screen may show people moving, e.g. throughout an enterprise, with a name/other identifier bubble above each person as they move around the enterprise, making it easier for security personnel to evaluate security risks from and/or to people.

It is noted that in an environment (e.g. an enterprise) there may be one or more separate computer vision systems, having separate databases for different technologies (e.g. for video conferencing, video surveillance, etc.). If there are separate databases, records may be replicated. For example, records associating the identification of a person with a respective reference representation may be replicated in more than one database, even if one or more locations of the person had been determined by only one of the computer vision systems.

As another example, once a probability of association with respect to a wireless device is sufficiently high, one or more identifiers of the wireless device may be mapped to the identity of the person who was associated with the wireless device, at a sufficiently high probability. The identification of the user of the device (e.g. including one or more of the mapped identifiers of the person) may be stored in a database, such as a secure access management database, which may be used for future login of the user to a wireless network in the wireless system. For example, the identification may be displayed on the wireless device, when the wireless device is being logged onto a wireless network. A record for the wireless device may include any of the following fields: (1) one or more identifiers of the wireless device, (2) one or more identifiers of the user of the wireless device, and/or (3) a probability of association calculated by the algorithm. Other appropriate fields are optionally included in the record.

In some embodiments, there may be a combined database used by a computer vision system and a wireless system. In such embodiments, a combined record for a wireless device and a person/user of a wireless device may include any of the following: (1) a reference representation of the person/user (2) one or more identifiers of the person/user, (3) one or more identifiers of the wireless device, and/or (3) a probability of association calculated by the algorithm. Other appropriate fields are optionally included in the record.

In some embodiments, after performing stage 390, the integration system may continue to iterate stage 380 and stage 390, thus attempting to further improve the respective probabilities of association with respect to one or more wireless devices and/or one or more people. Improved probabilities of association may be recorded in one or more databases. If there are separate computer vision systems, the various iterations may rely on data from the same computer vision system and/or from different computer vision systems. In such embodiments, the iterations may end with respect to a particular wireless device or person, for example, if 100% probability of association is reached.

In some embodiments, certain people and certain wireless devices may be identified by respective computer vision system and wireless system without integration of computer vision data and wireless data. For example, identification may need to be provided only for users of a subset of wireless devices which were not identified by the wireless system and/or only for a subset of people which were not identified by the computer vision system. In order to provide identification for the users of the subset of wireless device and/or in order to provide identification for the subset of people, a probability of association may be determined, for instance, with respect to each member of the subset of wireless devices vis a vis various people, and/or may be determined, for instance, with respect to each member of the subset of people vis a vis various wireless devices.

In some embodiments, the computer vision system may not have access to any reference representations/badging-in data for people, or the wireless system may not have access to any identification of users of wireless devices. In such embodiments, respective probabilities of association may necessarily be computed with respect to people and various wireless devices, in order to provide identification for the people; or with respect to wireless devices and various people, in order to provide identification for the users of the wireless devices.

Optionally, data generated by the integration system in performing method 300 may be used for purposes other than identification. For example, occupancy/presence data for an area, such as a meeting room, with regard one or more people may be stored for further analysis. Presence data with regard to a person may include, for instance, data regarding the presence of the person, and/or timing data regarding the presence of the person. In such an example, if analysis of the presence data reveals that a person is using a public room too often, or during hours when the person is supposed to be elsewhere, the issue may be addressed appropriately.

Figure 10:
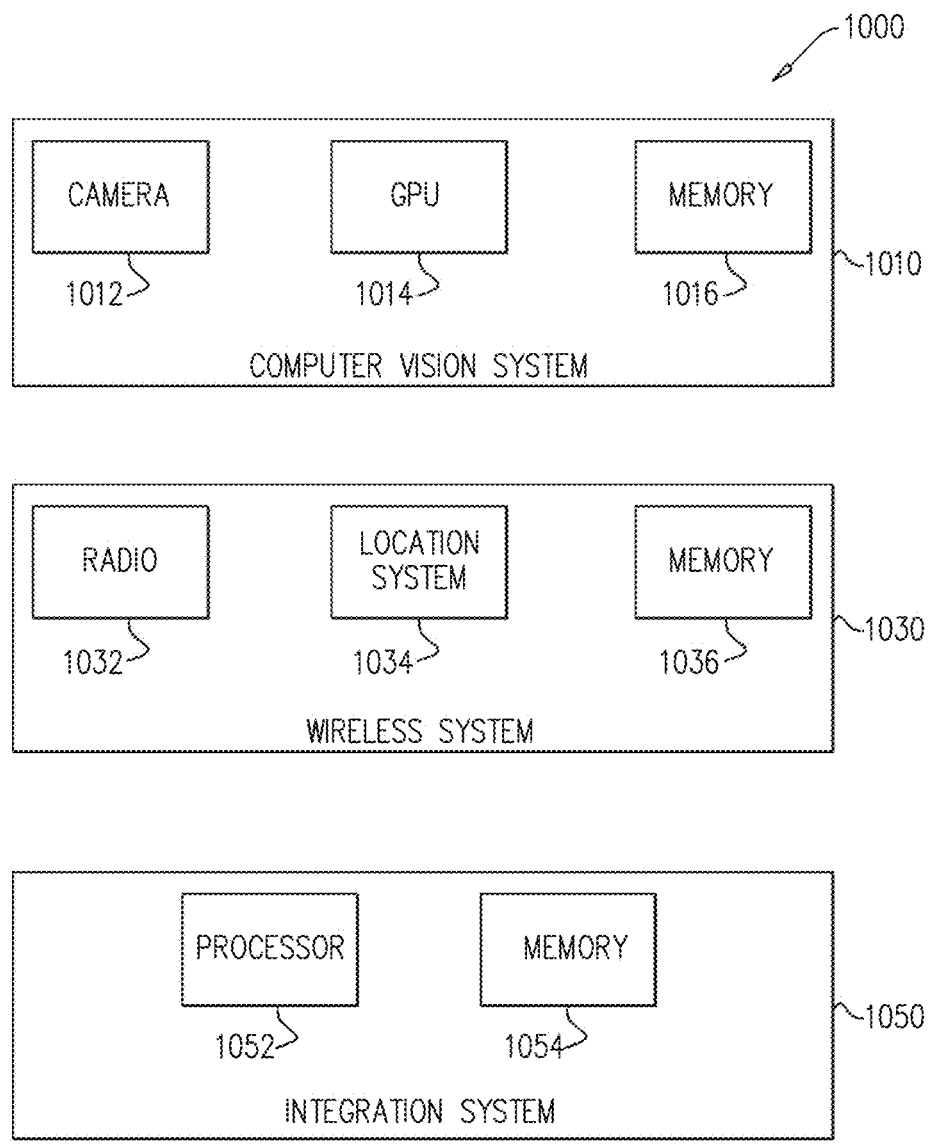
FIG. 10 is a block diagram of systems configured to perform operations described herein, in accordance with some embodiments of the presently disclosed subject matter.

FIG. 10 is a block diagram 1000 of systems 1010, 1030, and 1050 configured to perform operations described herein, in accordance with some embodiments of the presently disclosed subject matter.

Specifically, block diagram 1000 illustrates a computer vision system 1010, a wireless system 1030, and an integration system 1050.

As shown in FIG. 10, computer vision system 1010 may include at least one camera 1012 adapted to capture images and optionally to detect distances of objects in the images from the at least one camera 1012 based on the images. In some embodiments, the at least one camera 1012 may be included in at least one video endpoint. As shown in FIG. 10, computer vision system may further include at least one graphics processing unit (GPU) 1014 (e.g. in the at least one camera 1012) adapted to perform recognition (e.g. facial recognition). In some embodiments, the at least one GPU 1014 may be replaced by or supplemented by other elements (e.g. an artificial intelligence chip) for performing recognition. In some embodiments, one or more other non-GPU type processors may be included in computer vision system 1010. As shown in FIG. 10, computer vision system 1010 may further include at least one memory 1016. The at least one memory 1016 may store data used by the at least one GPU and/or used by other non-GPU type processors in the computer vision system, such as any of: computer readable program code, reference representations of various people, identifiers of various people, etc. The at least one memory 1016, for instance, may include an enterprise directory (i.e. database) of employees, including images of the employees, names and/or other identifying information. In some embodiments, computer vision system 1010 may be adapted to receive a badge number and/or other identifying information from any of one or more badge readers, e.g. in an enterprise, when a person badges in. In such embodiments, identifying information in the enterprise database may include badge numbers.

As shown in FIG. 10, wireless system 1030 may include at least one wireless network (e.g. Bluetooth, Wi-Fi, etc.) which includes at least one radio 1032 (e.g. at least one wireless access point for Wi-Fi). As shown in FIG. 10, wireless system 1030 may further include a location system 1034 (e.g. a local positioning such system such as a real time location system or near real time location system). As shown in FIG. 10, wireless system may further include at least one memory 1036 including a database (e.g. for secure access management) storing associations between wireless device identifiers and identifiers of the users of the wireless devices. Wireless system 1030 may include one or more processors (not shown), e.g. in the at least one radio 1032, elsewhere in the at least one network, and/or in location system 1034. Memory (e.g. at least one memory 1036 and/or any other memory in wireless system 1030) may store data used by such one or more processors such as any of computer readable program code, location coordinates for the at least one radio 1032, wireless device identifiers, identifiers of the users of the wireless devices, etc.

In some embodiments, the database for secure access management and the enterprise directory may be shared, and therefore implemented by a shared memory accessible to both computer vision system 1010 and wireless system 1030.

As shown in FIG. 10, integration system 1050 may include at least one processor 1052. As shown in FIG. 10, integration system 1050 may further include at least one memory 1054 for storing data used by the at least one processor 1052. The at least one processor 1052 may be adapted to perform one or more of the stages of method 300. The at least one memory 1054 may store computer readable code, the at least one processor being adapted to execute such computer readable program code in order to perform at least part of method 300. The at least one processor 1052 may include, for example, any of the following: at least one GPU, at least one digital signal processor (DSP(s)), at least one central processing unit (CPU), etc.

Integration system 1050 may be part of computer vision system 1010, or part of wireless system 1030, sharing, for instance processor(s) and/or memory/ies; or may be a separate system adapted to communicate with computer vision system 1010 and wireless system 1030.

The term computer, as used herein, refers to any device that includes at least one processor (e.g. in any of: computer vision system 1010, wireless system 1030, or integration system 1050). Any memory (e.g. in any of in any of: computer vision system 1010, wireless system 1030, or integration system 1050), which is also referred to herein as a computer readable storage medium may be: volatile, non-volatile, erasable, non-erasable, removable, non-removable, writeable, re-writeable memory, for short term storing, for long term storing, etc. One or more memories in computer vision system 1010, wireless system 1030, and/or integration system 1050 may include, for instance, any of: flip flops, latches, counters, shift register(s), other register (s), cache(s), random access memory (RAM), read-only memory (ROM), static random access memory (SRAM), dynamic random access memory (DRAM), flash memory, embedded DRAM, Double-Data-Rate DRAM (DDR-DRAM), SDRAM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a solid state drive, a tape, a cassette, etc. The location of any particular memory relative to the processor which accesses the data stored in the particular memory may vary depending on the embodiment and may include any appropriate location (e.g. in the same physical unit, not in the same physical unit but otherwise in the same location, remote, etc.). In general, memory (e.g., memory 1016, 1036, 1054, etc.) may be a non-transitory computer readable storage media encoded with instructions that, when executed by a processor (e.g., processor 1052), cause the processor to perform operations described herein.

In some embodiments, integration system 1050 may be located on the premises where at least part of wireless system 1030 (e.g. at least the at least one radio 1032) and at least part of computer vision system 1010 (e.g. at least the at least one camera 1012) are located. In some other embodiments, at least part of integration system 1050 may be remote from the premises, such as in a cloud. In some embodiments, wireless system 1030 and/or computer vision system 1010 may be located on the premises, whereas in some other embodiments, at least part of wireless system 1030 and/or computer vision system 1010 may be remote from the premises, such as in a cloud.

In some embodiments, any of computer vision system 1010, wireless system 1030 and integration system 1050 may be implemented by fewer, more and/or different elements than discussed herein with reference to FIG. 10, in order to perform the functionality described above (e.g. with reference to any of FIGS. 1 to 3).

Figure 11:
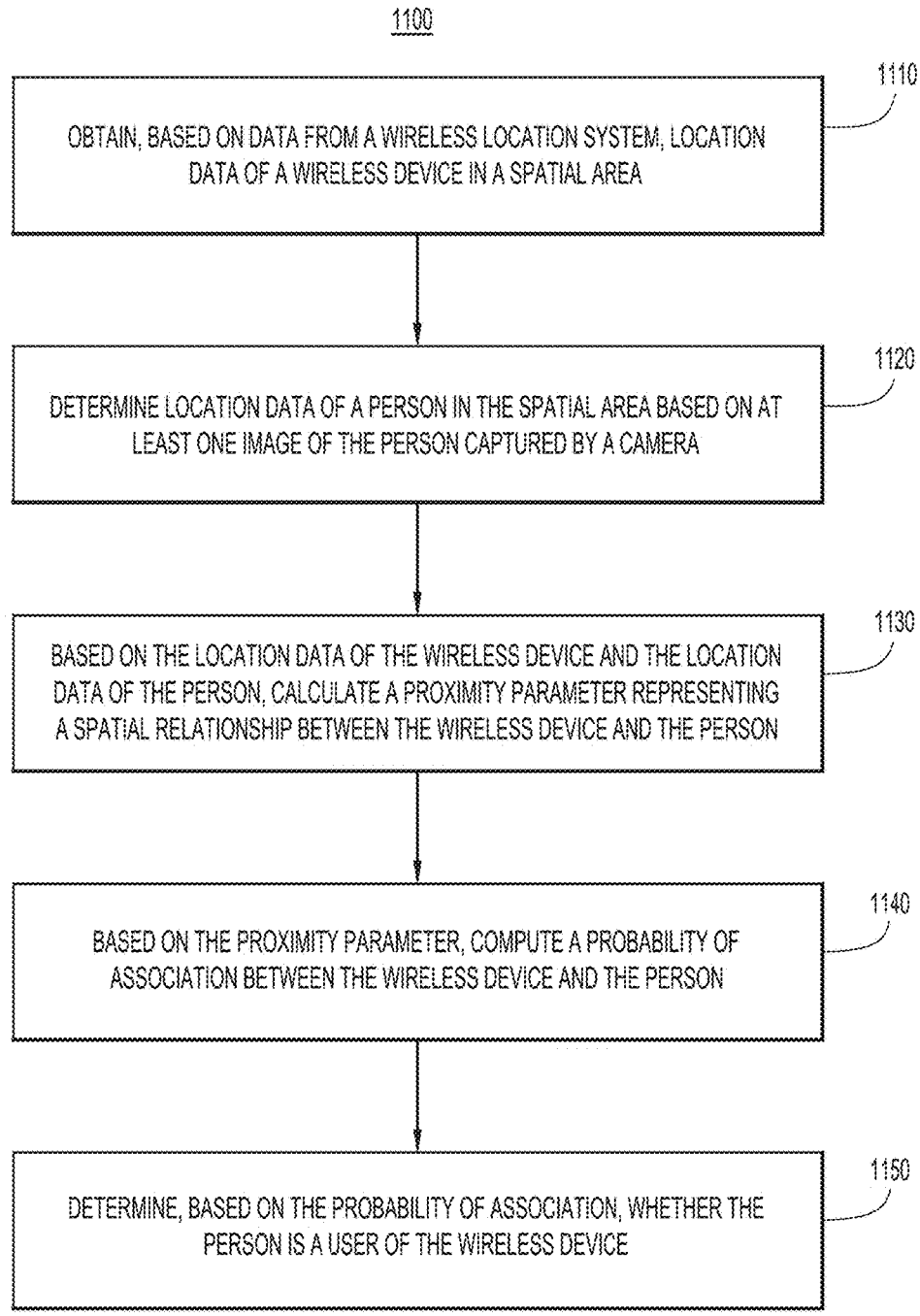
FIG. 11 is a flowchart of a generalized method for providing identification, in accordance with some embodiments of the presently disclosed subject matter.

FIG. 11 is a flowchart of a generalized method 1100 for providing identification. Method 1100 may be performed, for example, by integration system 150. At 1110, integration system 150 obtains, based on data from a wireless location system, location data of a wireless device in a spatial area. At 1120, integration system 150 determines location data of a person in the spatial area based on at least one image of the person captured by a camera. At 1130, based on the location data of the wireless device and the location data of the person, integration system 150 calculates a proximity parameter representing a spatial relationship between the wireless device and the person. At 1140, based on the proximity parameter, integration system 150 computes a probability of association between the wireless device and the person. At 1150, integration system 150 determines, based on the probability of association, whether the person is a user of the wireless device.

It will be appreciated that the subject matter contemplates, for example, a computer program product comprising a computer readable medium having computer readable program code embodied therein for causing a computer to execute one or more methods and/or one or more parts of method(s) disclosed herein, such as methods 300 (FIG. 3) and 1100 (FIG. 11). Further contemplated, for example, are computer readable program code for causing a computer to execute method(s) and/or part(s) of method(s) disclosed herein; and/or a computer readable medium having computer readable program code embodied therein for causing a network device to execute method(s) and/or part(s) of method(s) disclosed herein. A computer readable medium, for example, may include any suitable medium for transferring computer readable program code, e.g. if software is transferred to the network device in electronic form, over a network. Alternatively or additionally, a computer readable medium may include any suitable computer readable storage medium for storing computer readable program code, such as described above.

In one form, a method is provided. The method comprises: obtaining, based on data from a wireless location system, location data of a wireless device in a spatial area; determining location data of a person in the spatial area based on at least one image of the person captured by a camera; based on the location data of the wireless device and the location data of the person, calculating a proximity parameter representing a spatial relationship between the wireless device and the person; based on the proximity parameter, computing a probability of association between the wireless device and the person; and determining, based on the probability of association, whether the person is a user of the wireless device.

In another form, an apparatus is provided. The apparatus comprises: a memory configured to store instructions for providing identification; and a processor coupled to the memory, wherein the processor is configured to: obtain, based on data from a wireless location system, location data of a wireless device in a spatial area; determine location data of a person in the spatial area based on at least one image of the person captured by a camera; based on the location data of the wireless device and the location data of the person, calculate a proximity parameter representing a spatial relationship between the wireless device and the person; based on the proximity parameter, compute a probability of association between the wireless device and the person; and determine, based on the probability of association, whether the person is a user of the wireless device.

In another form, one or more non-transitory computer readable storage media are provided. The one or more non-transitory computer readable storage media are encoded with instructions that, when executed by a processor, cause the processor to: obtain, based on data from a wireless location system, location data of a wireless device in a spatial area; determine location data of a person in the spatial area based on at least one image of the person captured by a camera; based on the location data of the wireless device and the location data of the person, calculate a proximity parameter representing a spatial relationship between the wireless device and the person; based on the proximity parameter, compute a probability of association between the wireless device and the person; and determine, based on the probability of association, whether the person is a user of the wireless device.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method comprising:
obtaining, based on data from a wireless location system, location data of a wireless device in a spatial area;
determining location data of a person in the spatial area based on at least one image of the person captured by a camera;
based on the location data of the wireless device and the location data of the person, calculating a proximity parameter representing a spatial relationship between the wireless device and the person;
based on the proximity parameter, computing a probability of association between the wireless device and the person; and
determining, based on the probability of association, whether the person is a user of the wireless device.

2. The method of claim 1, wherein the wireless device is one of a plurality of wireless devices in the spatial area, and wherein determining, based on the probability of association, whether the person is a user of the wireless device comprises:
comparing the probability of association between the wireless device and the person to one or more other probabilities of association computed between the person and the other of the plurality of wireless devices in the spatial area.

3. The method of claim 1, wherein the person is one of a plurality of persons in the spatial area, and wherein determining, based on the probability of association, whether the person is a user of the wireless device comprises:
comparing the probability of association between the wireless device and the person to one or more other probabilities of association computed between the wireless device and the other of the plurality of persons in the spatial area.

4. The method of claim 1, wherein determining, based on the probability of association, whether the person is a user of the wireless device comprises:
determining whether the probability of association exceeds a predetermined threshold.

5. The method of claim 1, wherein computing the probability of association includes:
computing the probability of association further based on at least one previously determined probability of association between the wireless device and the person.

6. The method of claim 1, wherein the proximity parameter includes at least one of: a Euclidean distance, a three dimensional distance, and a mean square distance.

7. The method of claim 1, further comprising:
in response to determining that the person is a user of the wireless device, displaying an identification of the person in subsequent images captured by the camera, wherein the subsequent images include the person.

8. The method of claim 1, further comprising:
in response to determining that the person is a user of the wireless device, granting the wireless device access to a wireless network.

9. The method of claim 1, wherein the spatial area is a room, and wherein the method further comprises:
in response to determining that the person is a user of the wireless device, storing information regarding a presence of the person in the room at a specified time.

10. The method of claim 1, further comprising:
in response to determining that the person is a user of the wireless device, providing an identification of the person for association with a reference representation of the person in a database or a unified meeting roster.

11. An apparatus comprising:
a memory configured to store instructions for providing identification; and
a processor coupled to the memory, wherein the processor is configured to:
obtain, based on data from a wireless location system, location data of a wireless device in a spatial area;
determine location data of a person in the spatial area based on at least one image of the person captured by a camera;
based on the location data of the wireless device and the location data of the person, calculate a proximity parameter representing a spatial relationship between the wireless device and the person;
based on the proximity parameter, compute a probability of association between the wireless device and the person; and
determine, based on the probability of association, whether the person is a user of the wireless device.

12. The apparatus of claim 11, wherein the wireless device is one of a plurality of wireless devices in the spatial area, and wherein the processor is further configured to:
compare the probability of association between the wireless device and the person to one or more other probabilities of association computed between the person and the other of the plurality of wireless devices in the spatial area.

13. The apparatus of claim 11, wherein the person is one of a plurality of persons in the spatial area, and wherein the processor is further configured to:
compare the probability of association between the wireless device and the person to one or more other probabilities of association computed between the wireless device and the other of the plurality of persons in the spatial area.

14. The apparatus of claim 11, wherein the processor is further configured to:
determine whether the probability of association exceeds a predetermined threshold.

15. The apparatus of claim 11, wherein the processor is further configured to:
compute the probability of association further based on at least one previously determined probability of association between the wireless device and the person.

16. One or more non-transitory computer readable storage media encoded with instructions that, when executed by a processor, cause the processor to:
obtain, based on data from a wireless location system, location data of a wireless device in a spatial area;
determine location data of a person in the spatial area based on at least one image of the person captured by a camera;
based on the location data of the wireless device and the location data of the person, calculate a proximity parameter representing a spatial relationship between the wireless device and the person;
based on the proximity parameter, compute a probability of association between the wireless device and the person; and
determine, based on the probability of association, whether the person is a user of the wireless device.

17. The non-transitory computer readable storage media of claim 16, wherein the wireless device is one of a plurality of wireless devices in the spatial area, and wherein the instructions further cause the processor to:
compare the probability of association between the wireless device and the person to one or more other probabilities of association computed between the person and the other of the plurality of wireless devices in the spatial area.

18. The non-transitory computer readable storage media of claim 16, wherein the person is one of a plurality of persons in the spatial area, and wherein the instructions further cause the processor to:
compare the probability of association between the wireless device and the person to one or more other probabilities of association computed between the wireless device and the other of the plurality of persons in the spatial area.

19. The non-transitory computer readable storage media of claim 16, wherein the instructions further cause the processor to:
determine whether the probability of association exceeds a predetermined threshold.

20. The non-transitory computer readable storage media of claim 16, wherein the instructions further cause the processor to:
compute the probability of association further based on at least one previously determined probability of association between the wireless device and the person.

* * * * *